United States Patent [19]

Hoff, Jr.

[11] Patent Number: 4,506,981
[45] Date of Patent: Mar. 26, 1985

[54] METHOD FOR DETECTION OF BLOWN BEADS IN PNEUMATIC TIRES

[75] Inventor: Charles M. Hoff, Jr., Akron, Ohio
[73] Assignee: The B. F. Goodrich Company, Akron, Ohio
[21] Appl. No.: 434,213
[22] Filed: Oct. 14, 1982
[51] Int. Cl.³ .............................................. G01B 9/025
[52] U.S. Cl. .................................................. 356/347
[58] Field of Search ............................... 356/347, 348

[56] References Cited

U.S. PATENT DOCUMENTS 4,225,238  9/1980  Rottenkolber ..................... 356/348
4,234,256 11/1980  Yeager ............................... 356/348

OTHER PUBLICATIONS

Ralph M. Grant, *Holographic Tire Testing—Comments Upon the Structural Integrity of Truck Tires as Observed by Holography*, paper distributed by Industrial Holographics, Incorporated of Rochester, Mich.
*Introduction and General Machine Desciption*, excerpt from undated catalog of Industrial Holographics, Incorporated of Rochester, Mich.

*Primary Examiner*—Davis L. Willis
*Assistant Examiner*—Matthew W. Koren

[57] ABSTRACT

Areas (49) of improper cure in the vicinity of a bead (46, 47, 52, 53) in a pneumatic tire (11) are nondestructively detected by first generating a holographic interference pattern of the interior of the tire (11) in the region of the bead (46, 47, 52, 53). The resulting holographic interference pattern has an ordered pattern of fringe lines (60) produced by the bead (46, 47, 52, 53). A determination is made if there exists a band (64) of fringe lines (60) at the edge of and separated from the ordered pattern of fringe lines (60) produced by the bead (46, 47, 52, 53), and, if so, the number of fringe lines in the band (64) are counted. If the band (64) contains three or four fringe lines the tire (11) contains areas (49) of improper cure in the vicinity of a bead (46, 47, 52, 53).

3 Claims, 6 Drawing Figures

METHOD FOR DETECTION OF BLOWN BEADS IN PNEUMATIC TIRES

TECHNICAL FIELD

The present invention generally relates to the testing of tires. More particularly, the present invention pertains to the detection of areas of improper cure in the vicinity of a bead in an elastomeric, pneumatic tire, referred to as a "blown bead". More specifically, the present invention involves a method for the detection of blown beads in a pneumatic tire utilizing holographic interferometry.

BACKGROUND ART

Holographic interferometry is a known testing technique for nondestructively and economically evaluating various aspects of the structural integrity of pneumatic tires. This technique involves the comparison of two interference patterns which result when a beam of coherent light reflects off the tire and is recorded together with an unreflected portion of the same beam. A first interference pattern is set up and recorded under one set of conditions, a stress (such as environmental pressure) is placed on the tire, and then a second interference pattern is set up and recorded (preferably directly over the first interference pattern). The resulting composite pattern contains a pattern of "fringe lines", or contours of equal displacement. By measurement of the distance between fringe lines tire inner ply separation as minute as a fraction of the wavelength of the coherent light may be detected. Unfortunately, in many instances perturbations other than ply separations result in disturbances in the fringe pattern, making determination of an unacceptable tire on the basis of fringe line separation occasionally insufficiently reliable.

Areas of undercured elastomeric material in the vicinity of a pneumatic tire bead, commonly known as a "blown bead" condition, has been long recognized as a common point of premature failure in pneumatic tires, particularly so when applied in very demanding environments such as aircraft landing gear. Historically the likelihood of such a failure was nondestructively detected, if at all, by a human operator who manually examined the bead region and, entirely by touch, made the determination. Although many operators have developed an uncanny accuracy in making these inspections, such a procedure is unreliable as a result of its total subjectivity and dependence upon the operator's skill.

I have found a method employing holographic interferometry which discloses the existence of a blown bead in a pneumatic tire. This determination is made without measurement and independent of the distance between fringe lines in the holographic interference pattern.

DISCLOSURE OF INVENTION

It is, therefore, an object of the present invention to provide a reliable method for the nondestructive detection of areas of improper cure in the vicinity of a bead in an elastomeric load supporting member, such as a pneumatic tire.

It is a further object of the present invention to provide a reliable method for the nondestructive detection of a "blown bead" in a pneumatic tire qualitatively without evaluating the separation distance between plies in the bead area.

It is yet a further object of the present invention to provide a reliable method for the nondestructive detection of a "blown bead" in a pneumatic tire utilizing patterns of fringe lines produced by holographic interferometry without measurement and independent of the separation distance between fringe lines resulting from the bead area.

These and other objects and advantages of the present invention over existing prior art forms will become more apparent and fully understood from the following description in conjunction with the accompanying drawings.

In general a method for the detection of an area of improper cure in the vicinity of a bead in an elastomeric load supporting member, including the step of generating a holographic interference pattern of the interior of the elastomeric load supporting member, the holographic interference pattern having an ordered pattern of fringe lines produced by the bead, includes as the improvement the step of determining the existence of a band of fringe lines at the edge of and separated from the ordered pattern of fringe lines produced by the bead, the number of fringe lines in the band in a range from 3 to 4, inclusive.

PREFERRED EMBODIMENT FOR CARRYING OUT THE INVENTION

Figure 1:
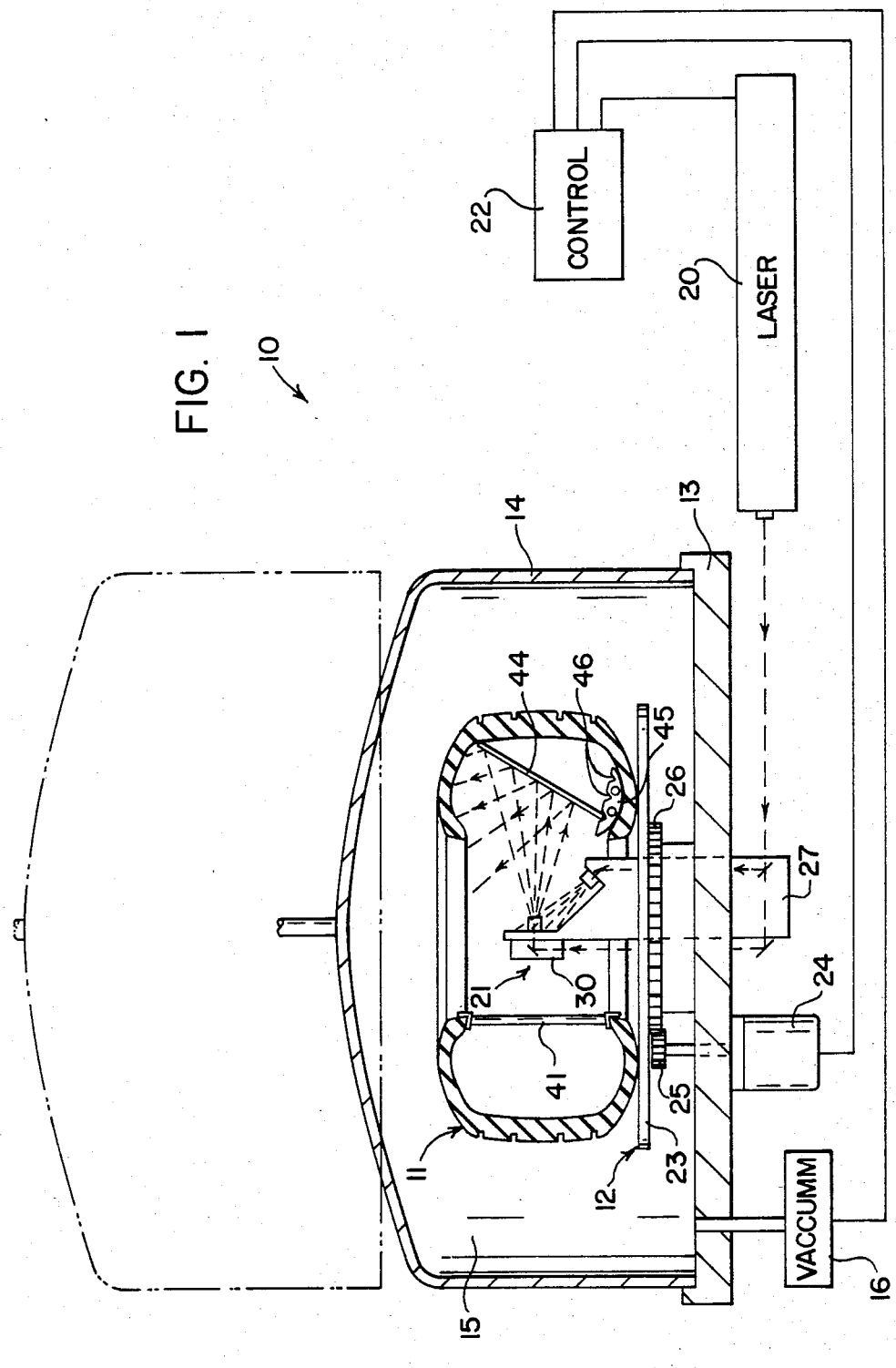
FIG. 1 is an elevational view of an apparatus for carrying out the method of the present invention, some elements of the apparatus being diagramatically depicted in block form.

FIG. 1 illustrates an apparatus, generally indicated by the numeral 10, for holographic nondestructive testing of a pneumatic tire 11, and which apparatus is suitable for carrying out the method of the present invention. Apparatus 10 broadly includes a rotatable tire test platform assembly 12, a stationary frame 13 and removable, cylindrical dome 14 for defining a chamber 15 surrounding tire 11 within which pressure changes may be induced by vacuum pump 16, a source of coherent light as laser 20, an optical and photographic assembly 21, and a control 22 for effecting the desired operation of apparatus 10. Although apparatus 10 shall be described in more detail hereinafter, it is readily commercially available from Industrial Holographics, Incorporated of Auburn Heights, Mich., in several different sizes such as the Model K160 Tire Analyzer.

Rotatable tire test platform assembly 12 includes a circular turntable 23 rotatably driven by an electric motor 24 through gears 25, 26 as required by control 22. Turntable 23 is preferably mounted so as to minimize vibration from the surrounding environment, and has a circular opening (not shown) in its center.

Figure 3:
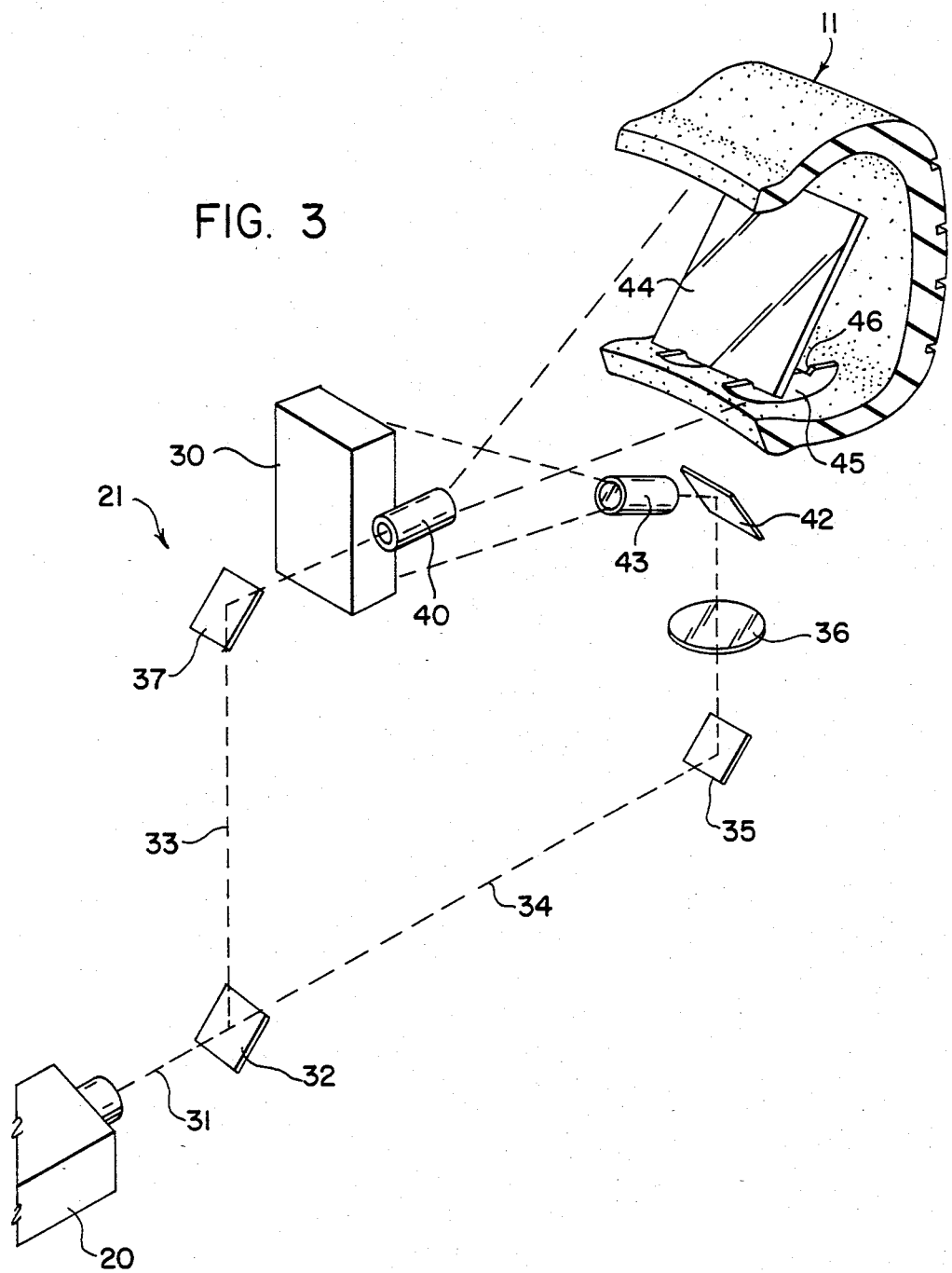
FIG. 3 is an enlarged perspective view of the optical paths for the apparatus shown in FIG. 1.

Optical and photographic assembly 21 has a carriage 27 fixedly mounted to frame 13 and extending upwardly through the circular opening in turntable 23 such that coherent light originating at laser 20 may be directed toward both the inside of tire 11 and a camera 30 by optical elements, all suitably mounted to carriage 27, as best shown in FIGS. 1 and 3. Coherent light generated by laser 20, which may be referred to as the primary laser beam 31, strikes a beam splitter 32 which reflects a portion of the beam to be identified as the tire illumination beam 33 upwardly through the opening in turntable 23 and permits the remaining portion of the beam, to be identified as the reference beam 34, to continue to a beam reflector, such as mirror 35, which reflects reference beam 34 upwardly through a light attenuator such as neutral density filter 36. Tire illumination beam 33 strikes a second beam reflector, such as mirror 37, which reflects tire illumination beam 33 through a lens 40 that diffuses the beam and illuminates the inside of tire 11 lying upon turntable 23 with its beads separated by spreader posts 41 at spaced intervals around tire 11. After passing through neutral density filter 36 reference beam 34 strikes a beam reflector, such as mirror 42, which reflects reference beam 34 through a lens 43 that diffuses the beam to illuminate the entire film frame in camera 30.

Apparatus 10 is designed for quantitative analysis of ply separation in a pneumatic tire, usually occurring in the tire crown, shoulder or sidewall regions. Accordingly, optical and photographic assembly 21 is not adapted to adequately illuminate and intercept a reflection from the bead region of tire 11. A flat mirror 44 of suitable tolerance may be positioned within tire 11 upon a cradle 45 to achieve the necessary illumination and permit the required reflection to implement the method of the present invention. Cradle 45 may have a plurality of notches 46 therein to adjust the angle of reflection of mirror 44 relative to camera 30 and lens 40.

Figure 2:
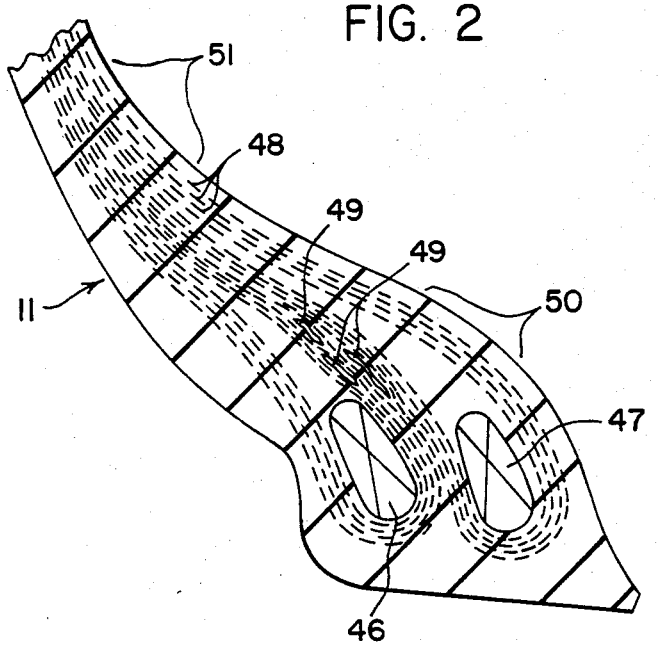
FIG. 2 is a fragmentary sectional view of a pneumatic tire having two beads and several pockets of undercure in the vicinity of the beads.
Figure 4:
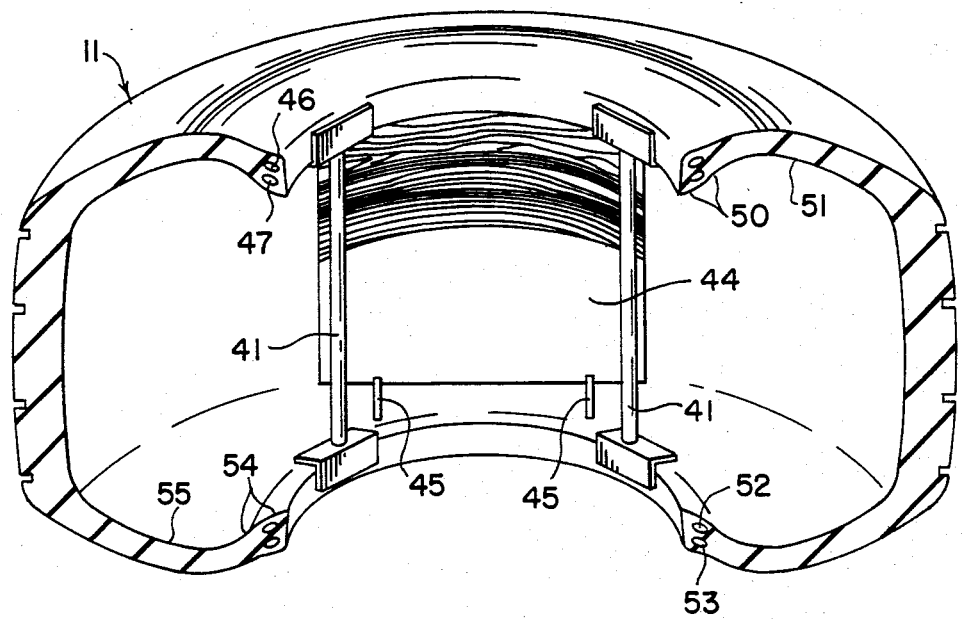
FIG. 4 is a fragmentary elevational view of a pneumatic tire configured for carrying out the method of the present invention, showing particularly bead spreader posts, a mirror and its cradle support.

The method of the present invention serves to nondestructively determine if regions of improperly cured elastomeric material exist in a pneumatic tire in the vicinity of the tire beads. FIG. 2 presents a partial sectional view of one side of a pneumatic tire 11 having two beads 46, 47, a plurality of reinforcing cords 48 embedded in plies surrounding beads 46, 47, and several regions of undercured elastomeric material in the vicinity of tire beads 46, 47, hereinafter referred to as pockets 49. In order to facilitate explanation of the operation of apparatus 10 in performing the method of the present invention, the vicinity of tire beads 46, 47 is identified in FIG. 2 as (say, upper) bead region 50, and the adjacent portion as (upper) sidewall region 51, an identical set of beads 52, 53, bead region 54 and sidewall region 55 being on the opposite (say, lower) side of tire 11, as seen in FIG. 4.

Prior to operation of apparatus 10 spreader posts 41 are positioned between bead regions 50 and 54 at suitable intervals to prevent bead regions 50, 54 from deforming when tire 11 is placed under stress, and tire 11 placed upon turntable 23 as shown in FIG. 1. The inside of tire 11 may be coated with a white paint or other substance to enhance its reflectivity. Cradle 45 is placed inside tire 11 and mirror 44 angularly wedged between a notch 46 in cradle 45 and the inside of tire 11 such that camera 30 receives the reflection of a portion of the bead region 50 or 54 of interest. Thereafter dome 14 is lowered over turntable 23 and, if not already done, laser 20 is energized, illuminating the selected bead region 50 or 54 and providing a reflected image to camera 30 as discussed hereinabove in conjunction with FIG. 2.

In operation apparatus 10 makes a double-exposure hologram resulting in an interference pattern of the type shown in FIGS. 5 and 6, to be further explained below. A first exposure is made by camera 30 with the environmental pressure surrounding tire 11 at a first, say atmospheric pressure. Next control 20 operates vacuum pump 16 to slightly reduce the pressure in chamber 15. As a result of air trapped in tire 11 at those locations where curing is not properly complete, this reduced pressure will cause any region of improperly cured elastomer in the vicinity of bead regions 50 and 54 to expand to form pockets 49, producing a change in the resulting interference pattern. A second exposure is then made by camera 30 with the image recorded directly over that of the first exposure, after which the film is advanced to the next unexposed frame.

This double-exposure process is repeated as many times as is necessary to examine the selected bead region 50 or 54. For tires that may be examined in the Model K160 Tire Analyzer, spreader posts 41 may be placed at ninety degree intervals around tire 11, and camera 30 may take a hologram viewing one quadrant in each exposure. Thus, in that instance it would be necessary to make four double-exposure holograms for each bead 50 and 54.

When a double-exposure process is complete, control 11 will return the pressure in chamber 15 to atmospheric and operate motor 24 to rotate turntable 23 such that the next quadrant is aligned for examination. Dome 14 is lifted off frame 13, cradle 45 and mirror 44 appropriately repositioned in the next quadrant, and dome 14 reseated upon frame 13, whereupon a new double-exposure process may be begun. Upon completion of the fourth hologram, tire 11 may be turned to lay on its opposite sidewall and the remaining bead examined.

Figure 5:
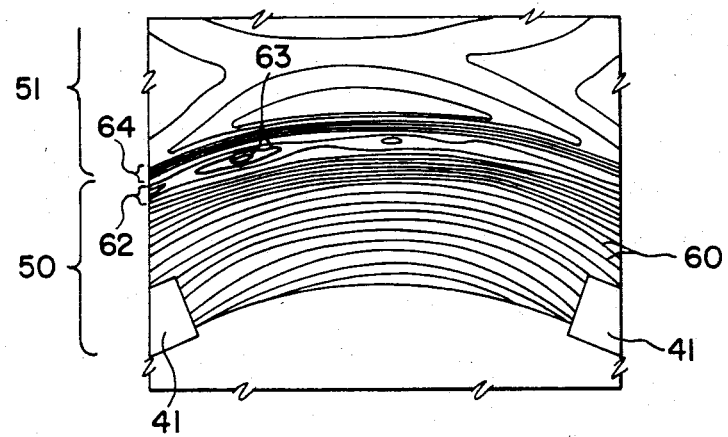
FIG. 5 is a holographic interference pattern for a portion of a pneumatic tire produced in accordance with the method of the present invention, illustrating a tire having pockets of undercured elastomeric material in the vicinity of the beads.
Figure 6:
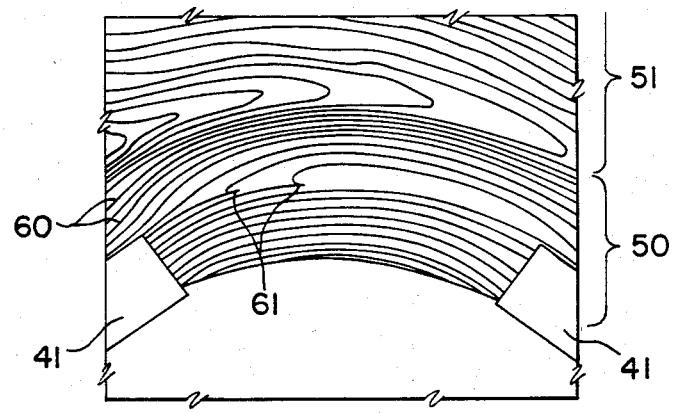
FIG. 6 is a holographic interference pattern for a portion of a pneumatic tire produced in accordance with the method of the present invention, illustrating a tire in which no pockets of undercured elastomeric material exist in the vicinity of the beads.

Two exemplary holographic interference patterns are presented in FIGS. 5 and 6. The edge of the pattern closest to the bottom of the drawing sheet, denoted as the "lower" edge, represents the image resulting from the outermost edge of the selected bead, which region for purposes of explanation may be taken to be bead region 50. A portion of the base of two adjacent spreader posts 41 are visible in the lower corners of each pattern. The image in each pattern moving from the lower to the opposite or upper edge corresponds to the pattern resulting from the edge of selected bead region 50, through bead region 50, and into sidewall region 51 adjacent thereto.

The patterns in FIGS. 5 and 6 each contain a plurality of fringe lines 60. In many instances where proper curing has taken place, fringe lines 60 in bead region 50 will be mostly parallel arcs having a radius of curvature substantially greater than the width of the pattern recorded by camera 30 and no individual fringe line 60 will appear which is not, for the most part, generally parallel to and similar in curvature to at least one of an immediately neighboring fringe line 60. FIG. 6 presents a holographic interference pattern for a quadrant of one bead region in such a tire. It should be noted that despite a small discontinuity 61 in two fringe lines in bead region 50, all fringe lines 60 in that region are substantially parallel and each appears generally similar to immediately neighboring fringe lines.

FIG. 5 represents a holographic interference pattern for a quadrant of one bead region of a tire which would be considered improperly cured. In FIG. 5, the pattern of fringe lines in the bead region 50, while including mostly "regular" fringe lines 60, differs from the pattern of fringe lines in the bead region 50 of a properly cured tire by the presence of a gap 62 which contains "irregular" fringe lines 63 formed as swirls or other irregular shapes which are not parallel to and not similar in curvature to any immediately neighboring fringe line. This gap 62 in the pattern of mostly regular fringe lines 60 isolates a group or band 64 of regular fringe lines 60 within the pattern between the gap 62 and the sidewall area 51. It has been found that when the isolated band 64 contains three or four regular fringe lines 60, such as shown in FIG. 5, the tire 11 invariably contains a blown bead.

Thus, in order to determine if tire 11 contains regions of improper cure in the vicinity of a bead, each double-exposure hologram, once developed, must be examined for a gap 62 in the fringe lines 60 in bead region 50. If a gap 62 is found, the number of fringe lines 60 in isolated fringe line band 64 must be counted. When three or four separate fringe lines are counted, the tire under examination has at least one pocket 49 therein.

The skilled artisan will now appreciate that the method described herein does not require a measurement of the separation between fringe lines to determine the existence of a blown bead. Since painstaking measurements are not necessary, the need for permanent records is also not as great. Accordingly, any of the well-known real time optical display devices may be employed in place of camera 30. Additionally, a device as this may be interfaced with a scanner which automatically determines the existence of fringe line band 64 and the number of separate fringe lines therein, activating an audio and/or visual warning device in the event a blown bead defect is found.

It should also be understood that the instant method may be practiced with any apparatus capable of generating an interference pattern utilizing a monochromatic, spatially and temporally coherent signal. Modifications may also be made to apparatus 10. For example, other types of stress (as sonic, thermal or direct pressure as by mechanical loading) may be used to force a change in the configuration of tire 11 resulting from a blown bead. Camera 30 may be constructed to scan a complete bead region or multiple cameras furnished to this end.

Inasmuch as the present invention is subject to many variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of nondestructively detecting areas of improper cure in the vicinity of a pneumatic tire bead.

I claim:

1. A method for the detection of an area of improper cure in the vicinity of a bead in an elastomeric load supporting member, including the step of generating a holographic interference pattern of the interior of the elastomeric load supporting member, the holographic interference pattern having an ordered pattern of fringe lines produced by the bead, wherein the improvement comprises the step of determining the existence of a band of fringe lines at the edge of and separated from the ordered pattern of fringe lines produced by the bead, the number of fringe lines in said band being in a range from 3 to 4, inclusive.

2. A method, as set forth in claim 1, wherein said step of determining the existence of a band of fringe lines includes the step of determining if there exists a gap in the ordered pattern of fringe lines produced by the bead.

3. A method, as set forth in claim 2, wherein the elastomeric load supporting member is a pneumatic tire and said step of determining the existence of a band of fringe lines includes the step of counting the fringe lines in said band.

* * * * *